(No Model.)

J. MARION.
COTTON CULTIVATOR.

No. 401,507. Patented Apr. 16, 1889.

Witnesses.
A. Ruppert.
H. A. Daniels

Inventor.
John Marion
Per
Thomas P. Simpson
Atty.

UNITED STATES PATENT OFFICE.

JOHN MARION, OF BAYOU LA CHUTE, LOUISIANA.

COTTON-CULTIVATOR.

SPECIFICATION forming part of Letters Patent No. 401,507, dated April 16, 1889.

Application filed September 6, 1888. Serial No. 284,737. (No model.)

*To all whom it may concern:*

Be it known that I, JOHN MARION, a citizen of the United States, residing at Bayou La Chute, in the parish of Caddo and State of Louisiana, have invented certain new and useful Improvements in Cotton-Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
The special object of my invention is to construct a straddle-row cultivator for cotton or other crops, so that the plows shall run close up to each side of the row of plants. A supporting-wheel will run near one side of the row, and the horse will walk in the water-furrow, which is formed between the beds containing the plants. Cotton-land is laid off in rows four feet apart, the same being thrown up into beds with an intermediate water-furrow.

Figure 1:
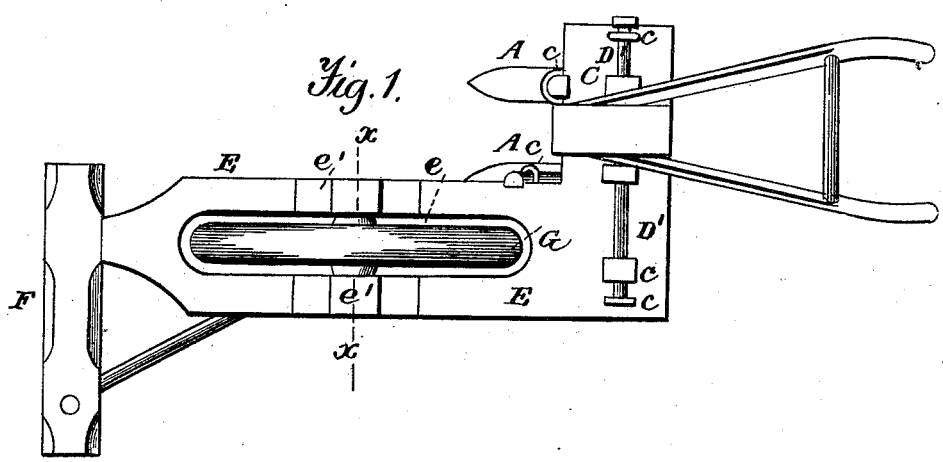
Figure 2:
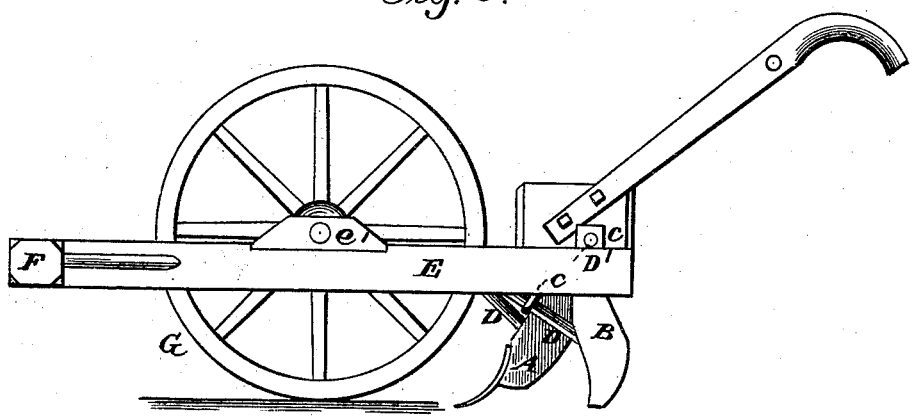
Figure 3:
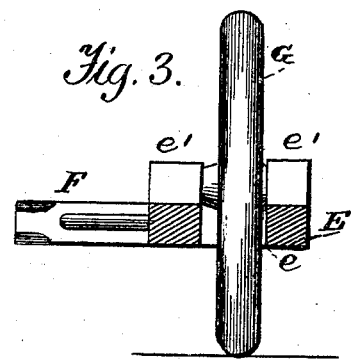

Figure 1 of the drawings is a plan view; Fig. 2, an elevation in perspective, and Fig. 3 a transverse vertical section on the dotted line *x x* of Fig. 1.
In the drawings, A A represent two standards carrying shovel-plows, and B a standard used as a support for the left side of the plow-frame.

E is the main beam, having at its right rear end a block, C, through which pass the standards A B, and are held by braces D and rods D', passing through keepers *c*.

F is a draft-beam projecting to the left of the main beam E, and having a hole for the draft-iron near its end.

G is a ground-wheel journaled at *e'* on beam E, and extending partly through the slot *e* thereof.

By this construction the shovels A A will run one on each side and close up to the row of plants, the wheel will run on the bed a little to the left of the plants, and the single horse will walk in the water-furrow.

I have used this cultivator with perfect success and find the side draft to be practically of no account.

What I claim as new, and desire to protect by Letters Patent, is—

A straddle-row cultivator consisting of a middle slotted main beam, E, provided with a draft-beam at the left of the front end and a plow-standard beam at the right of the rear end, two standards carrying shovel-plows on the right, and one supporting-standard on the left, all substantially as shown and described.

In testimony whereof I affix my signature in presence of two witnesses.

JOHN MARION.

Witnesses:
 L. S. CRAIN,
 J. HENRY SHEPHERD.